United States Patent Office
2,988,974
Patented June 20, 1961

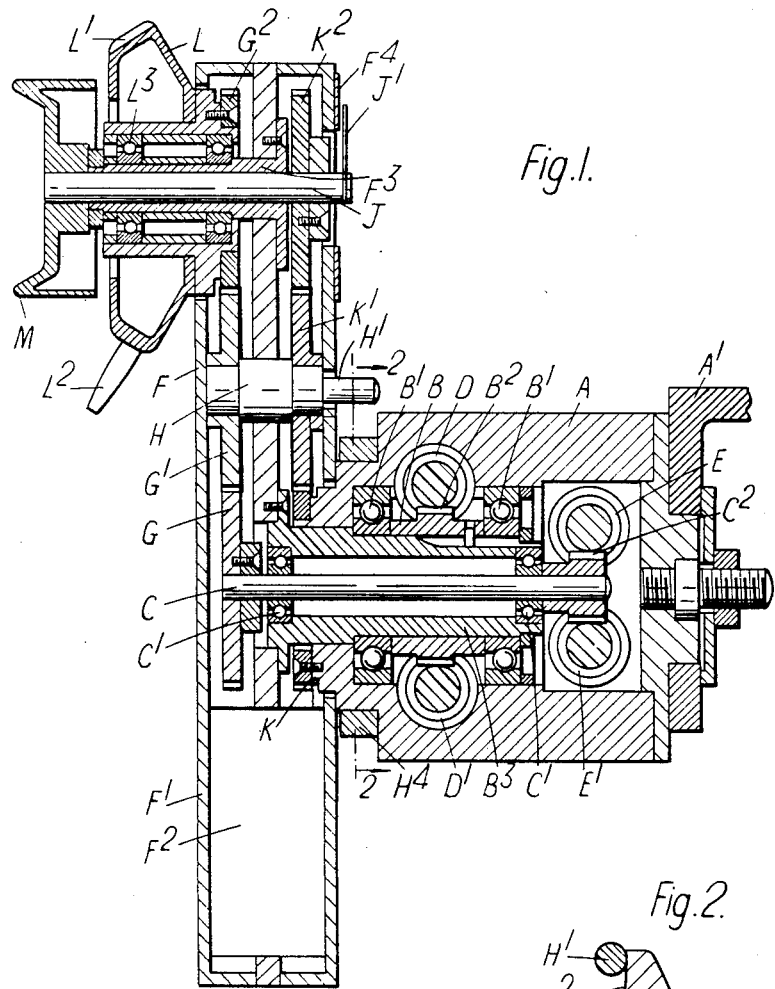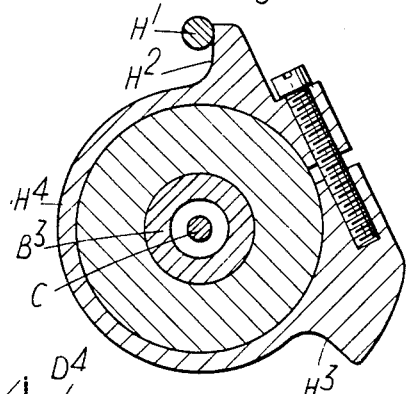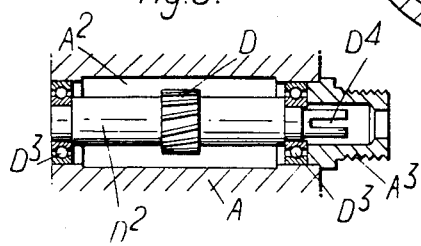
Inventors
T. W. Clifford
J. R. Adams
By
Attorneys

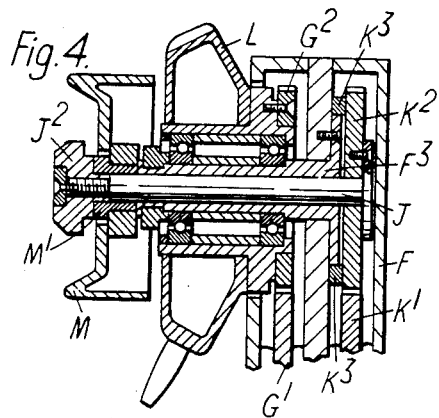
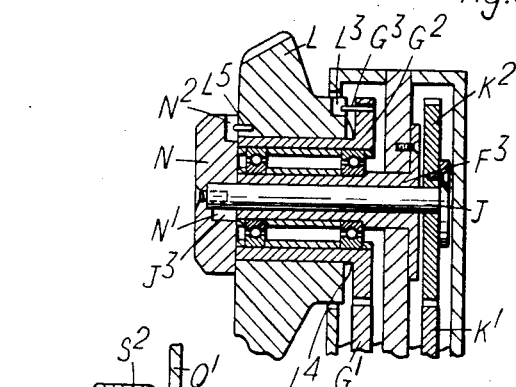
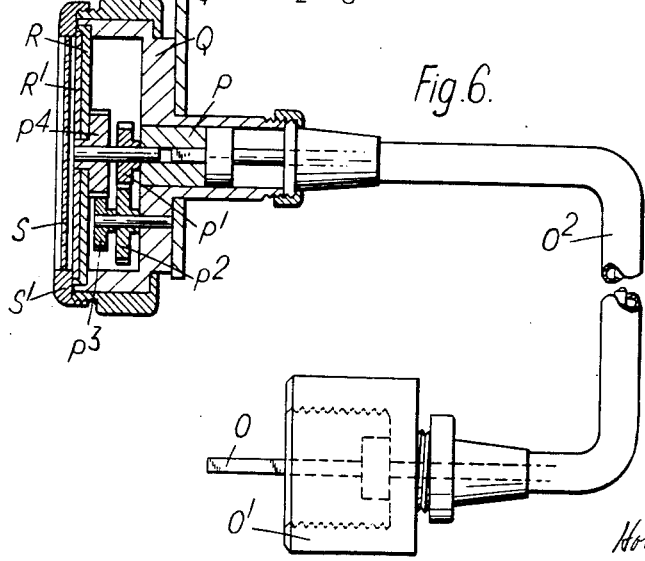

2,988,974
CONTROL DEVICES FOR OPTICAL OBJECTIVES OF VARIABLE FOCAL LENGTH
Thomas William Clifford and John Reginald Adams, both of 104 Stoughton St., Leicester, England
Filed May 31, 1960, Ser. No. 32,842
Claims priority, application Great Britain June 1, 1959
12 Claims. (Cl. 95—44)

This invention relates to a control device for a variable focus optical objective of the kind known as a "zoom lens," wherein parts of the objective are relatively movable in such a manner as to effect continuous variation of the equivalent focal length of the objective, and therefore also of its magnification, without altering the position of the image plane of the objective, means also being provided for focussing the objective to suit the distance of the object. For convenience of handling such an objective, it is often desirable to be able to control both the focussing mechanism and the zooming mechanism with a single hand, so as to leave the other hand free to control movement of the whole camera to direct the objective on to different parts of a complete scene. It has recently been proposed for this purpose to effect one of the two controls, respectively for focussing and for zooming, by swinging a crank arm about its axis, and the other control by rotating a hand knob on the free end of such crank arm, the focussing and zooming mechanisms being operatively connected, for example through worm gearing, respectively to two coaxial spindles, one of which is directly connected to the crank arm, whilst the other is connected to the hand knob through mechanism carried by the arm.

The present invention has for its object to effect improvements in such a control device whereby a more satisfactory control can be obtained.

The control device according to the invention comprises a fixed casing, two coaxial spindles within the casing operatively connected one to the focussing mechanism of the objective and the other to the mechanism for varying the equivalent focal length of the objective, a crank arm extending from one of such spindles, a control member carried by the crank arm and rotatable thereon about a pivot axis parallel to the main axis of the two spindles, a transmission mechanism having unity transmission ratio connecting the control member to the second of the two spindles, a reference member carried by the crank arm and rotatable relatively thereto about the said pivot axis, and a further transmission mechanism having unity transmission ratio connecting the reference member to the fixed casing. It should be made clear that each of the two transmission mechanisms maintains the sense of rotation in its transmission, so that the reference member has the same orientation in all positions of the crank arm.

Whilst the movement of the crank arm may be utilised to operate the focussing mechanism of the objective, it will usually be preferable to use such movement to control the mechanism for varying focal length, the rotation of the control member about the pivot axis being employed to control the focussing mechanism. Since it is desired to control both operations with a single hand, care must be taken to prevent inadvertent operation of one mechanism whilst the other is being operated. The provision according to the invention of a reference member which is held in the same orientation during movement of the crank arm facilitates avoidance of such an inadvertent operation. This can be effected in various ways.

Thus, in one arrangement, the control member may normally be spring-pressed into engagement with the reference member or with a part carried thereby, so as to be held against rotation relatively thereto, the arrangement being such that the control member can be released from such engagement against the spring action when it is desired to operate the control member for driving the second spindle.

In an alternative arrangement, the reference member is connected to a hand knob so mounted adjacent to the control member that the hand knob and the control member can readily be clutched together by hand during swinging of the crank arm. In this way, the control member can be held in the same orientation during such swinging, so that no drive is transmitted to the second spindle.

Frictional clamping means are preferably provided for applying frictional resistance against relative movement between the reference member and the crank arm, thus minimizing risk of inadvertent swinging of the crank arm during operation of the control member, whilst at the same time retaining the possibility of deliberate operation of the control member during swinging of the crank arm, if this should be required. The clamping means may be such that it can be tightened to lock the reference member to the crank arm, if desired, so as to prevent swinging of the crank arm about the main axis, whilst still leaving it possible to operate the control member.

The provision of a reference member, which is maintained in the same orientation during swinging of the crank arm, is also convenient for other purposes. Thus, the relative movement between the reference member and the crank arm may be utilised to give an indication of the objective adjustment effected by swinging of the crank arm. For instance, if such swinging controls the variation of focal length, a pointer carried by the reference member may cooperate with a scale on the crank arm, whose graduations indicate focal lengths. Alternatively, the relative movement between the crank arm and the fixed casing can similarly be utilised to give such indication.

The manner in which the drive is transmitted from each of the spindles to the mechanism controlled thereby may vary, but in one convenient arrangement, each spindle carries a worm engaging with a worm wheel from which the drive is taken to the appropriate driven mechanism through a detachable coupling. By providing two worm wheels engaging with opposite sides of the worm, so that the detachable coupling can be engaged at will with either worm wheel, it becomes possible to give the operator choice of either right-handed or left-handed operation of the crank arm and control member, whichever may be the more convenient in a particular installation.

The invention may be carried into practice in various ways, but some convenient practical arrangements of control device according thereto are illustrated by way of example in the accompanying drawings, in which FIGURE 1 is a vertical sectional view of one arrangement,
FIGURE 2 is a transverse vertical section on the line 2—2 of FIGURE 1,
FIGURE 3 is a fragmentary horizontal sectional view of a part of the arrangement of FIGURE 1,
FIGURES 4 and 5 respectively illustrate two modifications of the arrangement of FIGURES 1–3, and
FIGURE 6 shows an indicating device for use with the control device.

The control device according to the invention is generally applicable to any construction of variable focus objective of the "zoom" type, such for example as that forming the subject of U.S. Patent No. 2,649,025 or the improvement thereon forming the subject of the copending U.S. patent application Serial No. 764,006, wherein the objective has a stationary convergent rear member, an axially movable divergent middle member and an axially movable convergent front member, the movements of the front two members being so interrelated that the virtual image of a distant object formed by the divergent combination of such two members has a constant axial position relatively to the stationary rear member throughout the range of variation of the equivalent focal length of the objective. In such arrangement, the position of the final image plane of the objective remains constant, but the size of the image in such plane varies continuously during such zooming movements. Focussing of the objective to suit different object distances without alteration of the position of the final image plane can, in such arrangement, be effected by independently imparting a further axial movement to the movable front member of the objective.

Various forms of mechanism may be used for controlling the focussing and zooming movements of the objective, and mechanisms suitable for controlling the movements in objectives of the above-described kind form the subject of United States of America Patent No. 2,720,817 and of the copending United States of America application Serial No. 768,286. In each case, the focussing mechanism and the zooming mechanism are operated respectively by two coaxial toothed rings around the casing containing the mechanisms and the objective. Such casing is mounted on the front of the casing of the camera, which may for instance be a television camera, the whole being mounted on a carriage provided with two control devices, one of which controls movements of the whole camera to direct the objective on to a desired object, whilst the other controls the focussing and zooming movements, these control devices being detachably mounted on the carriage in positions convenient for operation respectively by the two hands of the operator. It is the latter of these control devices, namely that for controlling the focussing and zooming movements, with which the present invention is concerned, and the objective casing is provided with a fitting from which extend two flexible wire transmission devices respectively connected to gear wheels engaging with the focussing ring and the zooming ring on such casing, these flexible wire transmission devices terminating in couplings which can be plugged in to appropriate sockets on the control device.

This control device (see FIGURE 1) comprises a casing $A$ provided at its rear end with a fitting $A^1$ which can be clamped to the carriage in a chosen position convenient to the operator. This casing contains two coaxial horizontal spindles $B$ and $C$, which are mounted, one within the other and protrude from the front of the casing $A$. The outer spindle $B$ is mounted in bearings $B^1$ in the casing and carries a worm $B^2$ engaging with a worm wheel $D$ or preferably, as shown, with two worm wheels $D$ and $D^1$ respectively above and below the worm $B^2$, so that the two worm wheels will rotate in opposite directions. One of these worm wheels $D$ is shown in horizontal section in FIGURE 3 and it will be seen that this worm wheel is carried on a shaft $D^2$ mounted in bearings $D^3$ in a cylindrical recess $A^2$ in the casing $A$, the shaft $D^2$ carrying at one end a socket $D^4$, which is housed within an externally screwthreaded projection $A^3$ from the casing and serves to receive a plug of rectangular cross-section on the end of one of the flexible wire transmission devices leading to the mechanism controlling the objective, such plug protruding from a ring which screws on to the outside of the projection $A^3$. The provision of the two worm wheels $D$ and $D^1$ makes it possible to fit such plug alternatively into either of the sockets $D^4$ connected to these worm wheels and thereby to permit either left-handed or right-handed operation of the device, as the operator may prefer, the position of the control device on the carriage being chosen to suit such left-handed or right-handed operation. A cap (not shown) is preferably provided for screwig on to the projection $A^3$ containing the socket not in use.

The inner spindle $C$ is mounted in bearings $C^1$ in a sleeve $B^3$ keyed to the outer spindle $B$ and carries a worm $C^2$ engaging with a worm wheel $E$ or, as shown, a pair of worm wheels $E$ and $E^1$, which are mounted in the same manner as the worm wheel $D$ and carry alternative sockets for receiving a plug on the end of one of the flexible wire transmission devices.

Fitted on to the front end of the sleeve $B^3$ keyed to the outer spindle $B$ is a hollow crank arm $F$, extending at right angles to the spindle and preferably having a short extension $F^1$ on the other side of the spindle containing a counterweight $F^2$. Thus, swinging of the crank arm $F$ around the main spindle axis will drive the outer spindle $B$ and the associated worm wheel $D$ or wheels $D$, $D^1$. Whilst the converse arrangement may be used, it is preferred to employ this outer spindle $B$ for operating the zooming control and the inner spindle $C$ for operating the focussing control.

The inner spindle $C$ carries at its front end, within the hollow crank arm $F$, a gear wheel $G$ which engages with an idler gear wheel $G^1$ freely mounted on a pivot pin $H$ intermediate in the length of the crank arm, this idler gear wheel $G^1$ in turn engaging with a gear wheel $G^2$ which is rotatable about a pivot axle $J$ near the free end of the crank arm $F$ and is of the same size as the gear wheel $G$ on the end of the inner spindle $C$, so that it will rotate relatively to the crank arm $F$ at the same speed and in the same sense as the inner spindle $C$.

The crank arm $F$ also contains a further train of three gear wheels $K$, $K^1$, $K^2$ similar to that just described. The first $K$ of these three gear wheels is coaxial with the main spindle axis and is bolted to the casing $A$ so that it remains fixed in position. The middle idler gear wheel $K^1$, freely rotatable about the same pivot pin $H$ as that in the first train, thus runs round the first gear wheel $K$ when the crank arm $F$ is swung about the main axis. The third gear wheel $K^2$ is coaxial with the third gear wheel $G^2$ of the first train and is likewise of the same size as the gear wheel $K$ fixed to the casing $A$. It will be clear that with this arrangement, this third gear wheel $K^2$ always remains in the same orientation, when the crank arm $F$ is swung around its axis, and thus constitutes a reference member with respect to the swinging of the crank arm.

The pivot pin $H$ carrying the two idler gear wheels has an extension $H^1$, which protrudes through the wall of the crank arm $F$ and cooperates with a pair of stops $H^2$ and $H^3$ (see FIGURE 2) formed on a ring $H^4$ clamped to the casing $A$, thus limiting the rotational movement of the crank arm $F$ about its axis.

The various alternative arrangements of control device now to be described have the foregoing parts in common with one another and differ from one another in respect of the parts carried by the crank arm near the free end thereof.

In the arrangement shown in FIGURE 1, a control member $L$, in the form of a hollow knob fitted with finger grip recesses $L^1$ or projections $L^2$ on its periphery, is bolted to the third gear wheel $G^2$ of the first train and projects forwardly through the wall of the crank arm $F$. This control member $L$ is journalled on bearings $L^3$ carried by a hollow bracket $F^3$ fixed to the crank arm $F$ and passing through the control member. A pivot axle $J$, secured to the reference member constituted by the third gear wheel $K^2$ of the second train, passes forwardly through this hollow bracket $F^3$ and has rigidly fixed to its front end a hand knob $M$, which thus lies in front of the control member $L$. The shape and size of this hand knob $M$ are such that the operator can comfortably grasp both the hand knob and the control member, with his fingers engaging in the finger recesses $L^1$ or between the projections $L^2$ in the control member. The operator grasps these parts in this way when he is swinging the crank arm $F$ around the main axis for operating the zooming control, and it will be clear that this grasp ensures that the control member $L$ will not rotate relatively to the reference member $K^2$ during such swinging, so that there is no risk of inadvertent operation of the focussing mechanism during such swinging. If, in any position of the crank arm $F$, the operator wishes to operate the focussing mechanism, he can do so with his fingers, the control member L then rotating relatively to the hand knob M and to the reference member $K^2$ and driving the inner spindle C through the first train of gear wheels $G^2$, $G^1$, G.

The pivot axle J, on which the hand knob M and reference member $K^2$ are mounted may, if desired, protrude through the rear wall of the crank arm F and carry a pointer $J^1$ cooperating with a scale $F^4$ fixed to such rear wall, this scale bearing graduations indicating values of the equivalent focal length of the objective, so that the operator can watch this scale when effecting zooming control. Alternatively, a scale of focal lengths can be mounted on the wall of the fixed casing A to cooperate with a pointer carried by the crank arm F.

In an alternative arrangement, shown in FIGURE 4, the control member L is arranged in the manner above described, but the hand knob M surrounds a boss $M^1$ on the pivot axle J, which protrudes through the boss and has a screwthreaded end, on which a nut $J^2$ is mounted. The boss $M^1$ engages with the end of the hollow bracket $F^3$, which surrounds the pivot axle J and is fixed to the crank arm F, and the reference member $K^2$ is provided on its front surface with pads $K^3$ lying close to or engaging with part of the crank arm F or with part of the bracket $F^3$. It will thus be clear that, by tightening up the nut $J^2$ on the pivot axle J, the pads $K^3$ on the reference member $K^2$ will be drawn into frictional engagement with the crank arm F or the brackets $F^3$, and the degree of frictional resistance to the swinging of the crank arm F can thus be controlled by operation of the nut. The nut $J^2$ can be tightened up sufficiently to lock the crank arm F against swinging, if desired, and this may be desirable at times when change of equivalent focal length is not desired. An increase of frictional resistance, without such locking, is convenient when zooming is not required but when it is desired to retain a particular image size for a time. It still remains possible to change the image size from one chosen value to another, while minimizing risk of inadvertent zooming movement during maintenance of one value of equivalent focal length. This friction control does not affect the control member L, and focussing movements can be freely effected, as may be desired by rotation of the control member. In this alternative, the hand knob M may be rigidly mounted on the boss $M^1$, or may be left free to rotate thereon, or may even be dispensed with altogether, since the operator when swinging the arm F to effect zooming control can ensure holding the control member L steady by engagement of his hand on the nut $J^2$ and on the control member L, the front end of the nut in such case being conveniently shaped for this purpose. The extension of the pivot axle J to carry a pointer $J^1$ for focal length indication is equally applicable to this arrangement if desired, since the movement of the reference member $K^2$ to vary the frictional resistance to swinging of the crank arm is very small.

In a further alternative arrangement, shown in FIGURE 5, the control member L, instead of being bolted to the third gear wheel $G^2$ of the first train, is keyed to such gear wheel, by means of a slot $L^3$ and a pin $G^3$, so as to rotate therewith, but is free to be moved axially through a short distance under the control of an annular dished spring $L^4$. This spring $L^4$ acts to urge the control member L forwardly into engagement with a member N, which is clamped to the pivot axle J and is additionally held against rotation relatively thereto by a pin $J^3$ on the axle engaging in a slot $N^1$ in the member N. The control member L may be provided with a pin $L^5$ engaging in a slot $N^2$ in the member N, so that normally the control member L will be locked against rotation relatively to the reference member $K^2$, without relying on a hand grip to ensure this. The hand knob M in this alternative may be fixed to the pivot axle or may be freely rotatable thereon, or, as in the arrangement shown, may be omitted altogether. When it is required to effect focussing control, the operator must press the control member L inwardly against the action of the spring $L^4$, when it will be free to rotate relatively to the pivot axle J. Here again, the pivot axle J may be extended to carry a pointer $J^1$ for focal length indication, if desired.

In all these arrangements, the control member L may bear a focussing scale, with which a pointer (not shown) carried by the pivot axle J cooperates, if desired.

FIGURE 6 illustrates an alternative method of giving the desired indication of focal length or of focussing, derived from the worm wheels D, $D^1$ or E, $E^1$. Since only one of the two worm wheels D, $D^1$ or of the two worm wheels E, $E^1$ is required for transmitting the drive for zooming or focussing control, the other worm wheel of each pair is available for use for indication purposes, using an indicating device which can be plugged into the socket $D^4$ (or the corresponding socket on one of the other worm wheels). Such indicating device is shown in FIGURE 6, and will, for convenience, be described with reference to zooming control indication derived from the worm wheel D, but it will be understood that a precisely similar indicating device will also be plugged into the socket of one of the worm wheels E, $E^1$ for focussing control indication.

This indicating device comprises a plug O, for cooperation with the socket $D^4$, housed within a ring $O^1$ which screws on to the projection $A^3$. This plug O is connected through a flexible wire transmission device $O^2$ to a shaft P housed within a casing Q which can be clamped by means of a bracket $Q^1$ in any position on the apparatus convenient to the operator. This shaft P drives through a chain of gear wheels $P^1$, $P^2$, $P^3$, $P^4$ a holder R, which is rotatably mounted within the casing Q and carries an indicating disc $R^1$. This indicating disc is visible through a window S mounted in a front cap $S^1$ which can be screwed onto a ring $S^2$ rotatably mounted on the casing Q. This window S bears an index mark, which cooperates with a scale on the indicating disc $R^1$ and it will be clear that the index mark can be initially set relatively to the zero of the scale by rotating the ring $S^2$ on the casing Q. The actual indication given may vary to suit the wishes of the operator, and alternative indicating discs may be provided for selection by the operator. Since the two worm wheels D and $D^1$ (and likewise the two worm wheels E and $E^1$) rotate in opposite directions, each indicating disc may conveniently be printed on the front and on the back with the appropriate right-handed and left-handed scales, so that the operator can insert it whichever way round is necessary to suit the particular worm wheel from which it is driven. For example, for zooming control, one indicating disc may bear a scale of focal lengths in inches or in centimetres or both, whilst another for alternative use may bear a horizontal angle scale and yet another a diagonal angle scale. Similarly, for focussing control one disc may bear a scale of object distances in feet and an alternative disc a similar scale in metres, whilst another alternative disc may bear a scale in arbitrary units, if preferred.

It will be appreciated that the foregoing arrangements may be modified in various ways within the scope of the invention. Thus, for instance, in each train of gear wheels any odd number of idler gear wheels may be provided between the first gear wheel and the final gear wheel. Alternatively, other forms of transmission mechanism having unity transmission ratio may be used instead of the gear train, for example a simple belt and pulleys, or a perforated belt and sprocket wheels. Again, other forms of transmission mechanism may be used in place of the worms and worm wheels, and may likewise be duplicated to provide right-handed and left-handed drives to suit the operators' wishes.

What we claim as our invention and desire to secure by Letters Patent is:

1. A control device for an optical objective of variable focal length of the kind known as a "zoom" lens for controlling the focussing mechanism of the objective and also the mechanism for varying the equivalent focal length of the objective, and comprising a fixed casing, two coaxial spindles within the casing, means whereby such spindles can be operatively connected one to the focussing mechanism and one to the mechanism for varying the equivalent focal length, a crank arm extending from one of such spindles, a control member, means for mounting the control member rotatably on the crank arm about a pivot axis parallel to the main axis of the two spindles, a transmission mechanism having unity transmission ratio connecting the control member to the second of the two spindles, a reference member, means for mounting the reference member rotatably on the crank arm about the said pivot axis, and a further transmission mechanism having unity transmission ratio connecting such reference member to the fixed casing.

2. A control device as claimed in claim 1, including means whereby the control member can be held against rotation relatively to the reference member during swinging of the crank arm about the main axis of the two coaxial spindles.

3. A control device as claimed in claim 2, in which the means for holding the control member and the reference member against relative rotation comprises a hand knob operatively connected to the reference member, and means for mounting the hand knob adjacent to the control member whereby the hand knob and the control member can readily be clutched together by hand during swinging of the crank arm.

4. A control device as claimed in claim 2, including frictional clamping means for applying frictional resistance against relative movement between the reference member and the crank arm, and means whereby such frictional resistance can be varied at will.

5. A control device as claimed in claim 2, including means whereby relative movement between the reference member and the crank arm is utilised to give an indication of the objective adjustment effected by swinging of the crank arm.

6. A control device as claimed in claim 1, including a locking member operatively connected to the reference member, and spring means for urging the control member into locking engagement with such locking member, whereby the control member is normally locked against rotation relatively to the reference member but can be released at will therefrom against the spring action when it is desired to operate the control member for driving the second spindle.

7. A control device as claimed in claim 1, including frictional clamping means for applying frictional resistance against relative movement between the reference member and the crank arm.

8. A control device as claimed in claim 7, including means for varying the said frictional resistance, whereby such resistance can be increased at will so as substantially to lock the reference member to the crank arm and thereby to prevent swinging of the crank arm about the main axis of the two coaxial spindles.

9. A control device as claimed in claim 1, including, in association with each of the two coaxial spindles, two members driven in opposite directions by such spindle, and a coupling element carried by each of such members cooperating with a detachable coupling element forming part of the operative connection to the objective mechanism controlled by the spindle, whereby such detachable coupling element can be engaged at will with either of the coupling elements carried by the two oppositely driven members.

10. A control device as claimed in claim 9, including means for indicating the objective adjustment effected by rotation of the said spindle, and a detachable coupling element operatively connected to such indicating means, whereby such detachable coupling element and the detachable coupling element forming part of the operative connection to the controlled objective mechanism can respectively be engaged with the two coupling elements carried by the two oppositely driven members.

11. A control device as claimed in claim 1, including, in association with each of the two coaxial spindles, means driven by such spindle for indicating the objective adjustment effected by rotation of such spindle.

12. A control device as claimed in claim 11, in which the operative connection from the spindle to the indicating means includes a flexible wire transmission device and a detachable coupling between such device and the spindle.

References Cited in the file of this patent

UNITED STATES PATENTS 2,940,373   Berg ------------------ June 14, 1960